Nov. 6, 1956  G. E. COMSTOCK, 3D  2,769,969
ELECTROMAGNETIC MICROMETER
Filed March 30, 1955
3 Sheets-Sheet 1

INVENTOR
GEORGE E. COMSTOCK 3rd.
BY
ATTORNEY

Nov. 6, 1956

G. E. COMSTOCK, 3D 2,769,969

ELECTROMAGNETIC MICROMETER

Filed March 30, 1955

INVENTOR
GEORGE E. COMSTOCK 3rd.
BY
ATTORNEY

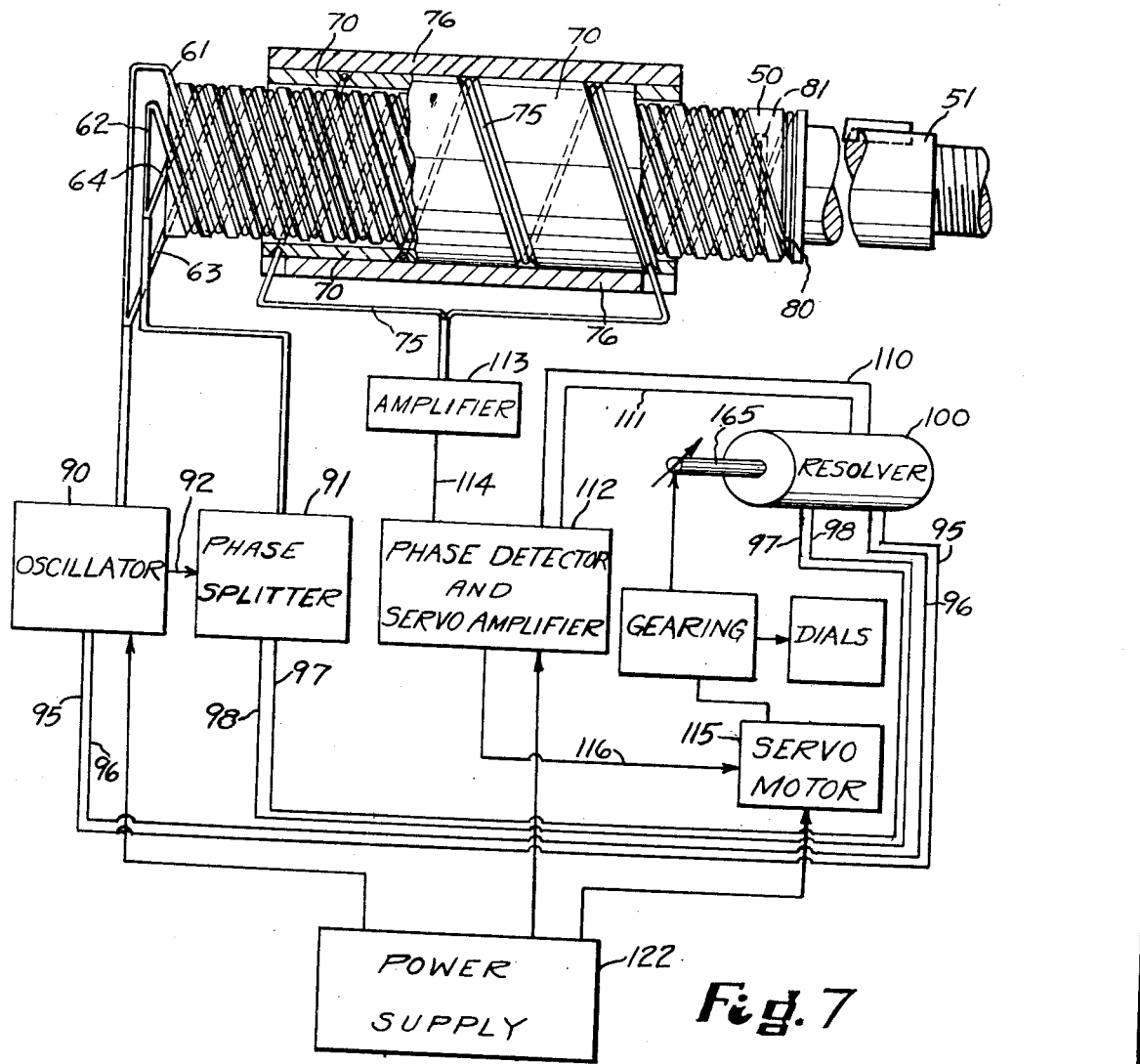
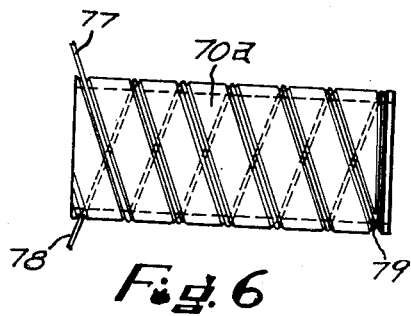
Fig. 7
Fig. 6
INVENTOR.
GEORGE E. COMSTOCK 3rd.
BY
ATTORNEY

United States Patent Office 2,769,969
Patented Nov. 6, 1956

2,769,969
ELECTROMAGNETIC MICROMETER
George E. Comstock 3d, Holden, Mass., assignor to Norton Company, Worcester, Mass., a corporation of Massachusetts Application March 30, 1955, Serial No. 497,940
6 Claims. (Cl. 340—196)

The invention relates to measuring apparatus especially for measuring to very close precision limits and constitutes a linear translation to rotation transducer and is also quite properly termed an electromagnetic micrometer.

One object of the invention is to provide apparatus of the nature indicated which can be made as sensitive as desired merely by adding more turns to the coils. Another object of the invention is to provide an electromagnetic micrometer involving readily available electrical apparatus. Another object of the invention is to provide an apparatus of the type indicated which can measure a distance of several feet to an accuracy of a fraction of a thousandth of an inch.

Another object of the invention is to provide an apparatus of the type indicated in which the accurate relatively moving parts employed as the measuring device are not in physical contact, and the accuracy of which is therefore not subject to deterioration due to mechanical wear.

Other objects will be in part obvious or in part pointed out hereinafter.

In the accompanying drawings illustrating one of many possible embodiments of the electrical-mechanical features of the invention, Figure 1 is a view partly in vertical section and partly in end elevation of a measuring machine incorporating the invention having a movable table upon which the article to be measured may be secured.

Figure 6 illustrates a modification of the winding of the movable coil of the transducer, Figure 7 illustrates the movable and stationary coils which initiate the measurement together with a block diagram of the electrical apparatus actuated thereby which collectively transmit the signal to the resolver controlling the servomotor to provide the desired signal to the motor.

Figure 1:
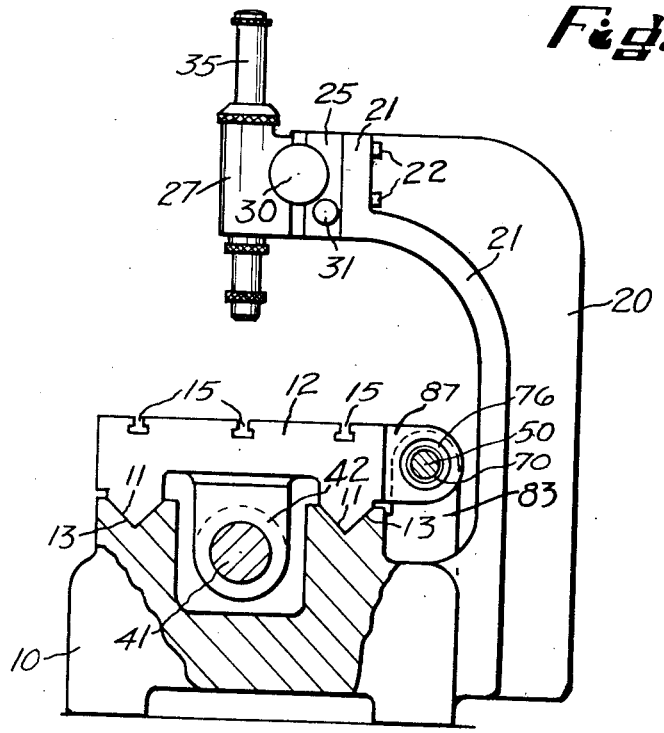

Referring first to Figure 1, while the physical elements of the micrometer may take many possible forms, one practical embodiment is illustrated therein in which a massive base 10, which can be made out of cast iron, has a pair of V-ways 11 supporting a table or carriage 12 having complementary V-ways 13 whereby table or carriage 12 can be moved rectilinearly with very close conformance to a straight line and the base 10 and carriage 12 are rigid enough so that errors due to warpage, vibration and the like are minimized. The table or carriage 12 has conventional T-slots 15 whereby with the use of T-bolts, not shown, an article to be measured can be securely clamped thereto.

Extending rearwardly and upwardly from the base 10 is a support 20 which can be integral with the base as indicated or might be a separate member bolted thereto. Through the upper portion of a reinforcing web 21 of the support 20 extend bolts 22 into a microscope slideway member 25 on the ways of which is supported a microscope holding member 27 which can be moved up and down by means of a feed pinion knob 30 and a vernier adjustment knob 31. As such apparatus for accurately positioning a microscope is now well known it is unnecessary to describe or illustrate the parts in detail. The holder 27 holds a microscope tube 35 with an eyepiece and objective lenses.

Figure 2:
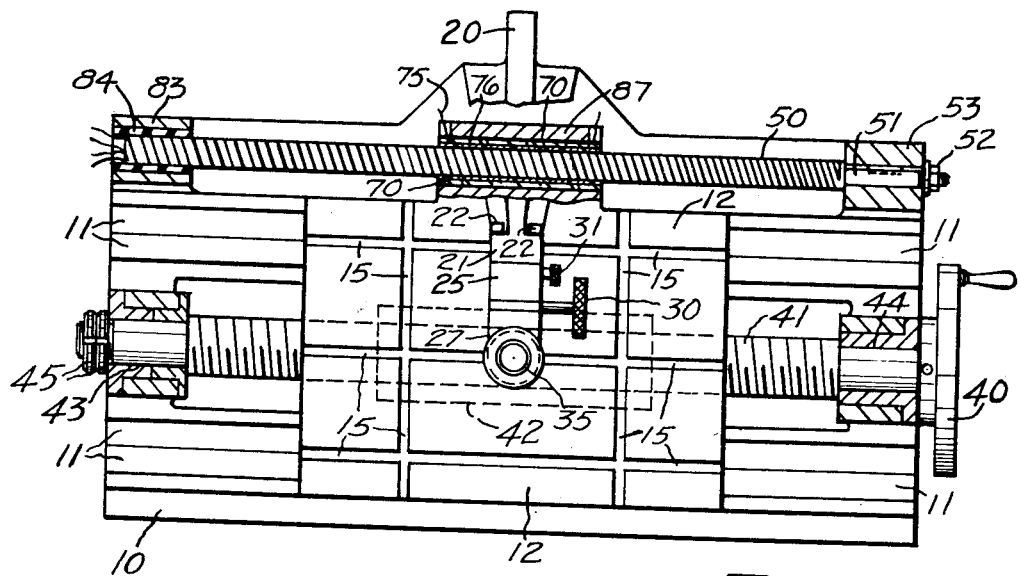
Figure 2 is a plan view of the machine with the table screw bearings and some other parts shown in section.

Referring now to Figures 1 and 2, a hand wheel 40 is connected to a screw shaft 41 which passes through a nut 42 which is secured to the under side of the table or carriage 12 and consequently by turning the hand wheel the table or carriage 12 can be moved, but power mechanism to rotate the screw shaft 41 could be substituted, it being desirable that such power mechanism be capable of rotating the screw 41 by large or small increments and capable of reversing it also. The screw shaft 41 is shown as journalled in thrust bearings 43 and 44 and the screw shaft has nuts 45 outside of the bearing 43 to take out play.

Referring now to Figure 7 in connection with Figure 2, I provide an electromagnetic transducer which comprises a shaft 50 having a reduced portion 51 secured by means of a nut 52 to a bored portion 53 of the base 10. The shaft 50 is quadruply threaded the four threads leading in the same direction and being pitched from each other by equal increments and as an illustrative embodiment of the invention, the lead can be forty thousandths with the pitch ten thousandths of an inch, i. e. each individual thread has 25 turns to the inch. In each thread is wound a fine gauge wire. The diameters of these wires are desirably less than the depths of the thread grooves so that the wires will be completely buried. Also I prefer that the lands of the threads shall be flat, that is to say parts of cylindrical surfaces in order to be able to position the primary and secondary of the transducer as close to each other as possible.

The shaft 50 should be non-magnetic in order that it shall not distort the field of the transducer. It is desirable that its thermal expansion coefficient be either as small as possible, or on the other hand, as near to that of cast iron and steel as is possible. In the former case fused quartz is an excellent material as it has a very small coefficient of thermal expansion. In the latter case a nonmagnetic stainless steel might be selected for the material of the shaft 50. The latter material gives another advantage in that it is easier to cut the threads therein than in fused quartz.

The shaft 50 should also have dimensional stability. Both fused quartz and stainless steel with proper heat treatment have this characteristic to a high degree. In this connection the shaft 50 should be threaded as accurately as possible, that is to say the accuracy of the machine is to a considerable extent a function of the accuracy of the threading. Of course for some machines for measurements which are to be better than those usually made but need not be excessively precise, a ground thread may suffice. For embodiment of the invention in the highest precision machine, lapped threads will be preferred.

It is desirable that the shaft 50 have low electrical conductivity, and stainless steel has this property compared to copper and aluminum, although of course the resistivity of quartz is millions of times greated than that of stainless steel. The reason for wanting low conductivity is to minimize electromagnetic field distortion due to eddy currents.

Other materials which can be used for the shaft 50 are various ceramic materials many of which are cheaper than fused quartz, and in this connection the sintered materials such as sintered alumina or sintered mullite may be highly practical. Steatite has the advantage of ease of manufacture and glass rods can be used for some applications. What material is used depends on a number of factors of which perhaps the most important is the importance of cost in the manufacture of the machine. With cost of less importance, fused quartz rods will be preferred for most applications.

Wires 61, 62, 63 and 64 are wound in the threads of the shaft 50, the order of the winding being the same as the order of these numbers. The turns should not be short-circuited and hence, if the tube 50 is made of metal the wires 61, 62, 63 and 64 should be insulated such as by an enamel insulation, but if the tube is quartz the wires can be bare. It is highly desirable to cement the wires in place to keep turns from loosening and there are many materials which can be used for this purpose such as various varnishes, synthetic resins including those now known as potting compounds.

Outside of the shaft 50 is a tube 70 which is threaded with a single thread on the outside and this tube 70 can be made of any of the materials mentioned for the shaft 50 and the same considerations apply. A wire 75 is wound in the single thread on the tube 70 and this wire 75 will be insulated if the tube 70 is made of metal, otherwise it need not be as in the case of the wires 61, 62, 63 and 64. Cement may also be applied to the wire 75 and because preferably the tube 70 has a very thin wall, for example of the order of 10 one-thousandths of an inch, it is desirable for mechanical strengthening of the tube 70 to provide an outer tube 76 encasing it.

The single thread ground on the outside of the tube 70 has the same lead as the four threads ground on the outside of the shaft 50. On the shaft 50 the wire 61 is connected to the wire 63 and the wire 62 is connected to the wire 64, which is another way of saying that the wires 61 and 63 can be the same wire and so also the wires 62 and 64, two ends of a given wire being at one end of the shaft 50 and at the other end thereof these ends being looped to reverse the twist so as to make two wires out of one. In other words wires 61 and 63 constitute a bifilar pair and so do wires 62 and 64. The bifilar pairs may lead in from the same end or if desired at opposite ends.

Figure 7 shows a single winding of the wire 75 but a bifilar pair can be used to make a double winding and this will give twice the sensitivity so will be preferred but for simplicity in the drawing I have shown a single turn in Figure 7. Figure 7 illustrates the bifilar pair winding for the primary of the transducer, for it will now be appreciated that the wires 61, 62, 63 and 64 constitute the primary while the wire 75 constitutes the secondary. In Figure 6 the bifilar pair on the tube 70a consists of wires 77 and 78 looped at the ends opposite the input ends, and they can be separate wires or the same wire back-threaded at 79 as is the wire 61—63 at 80 in Figure 7 and the wire 62—64 at 81 in Figure 7.

Referring now to the left-hand upper corner of Figure 2, one end of the shaft 50 may merely be supported by the base 10. A bored portion 83 of the base 10 has therein an insulating bushing 84 supporting the left hand end of the shaft 50. The outer tube 76 which supports the tube 70 and its secondary winding 75 is, as shown in Figures 1 and 2, supported by a bracket 87 which is attached to or preferably, as indicated, integral with the table or carriage 12. Thus movement of the table or carriage 12 moves the secondary winding along the primary winding to vary the coupling coefficient between the bifilar secondary winding and the two bifilar primary windings.

Referring to Figure 7, the primary winding pair 61—63 is excited by oscillator 90, and primary winding 62—64 is excited by phase splitter 91 which derives its input from the oscillator 90 through connection 92.

Phase splitter 91 is so designed that the alternating current flowing in primary winding 62—64 has a sinusoidal waveform differing in time phase angle from the exciting current of primary winding 61—63 by 90 degrees, and of amplitude equal to the amplitude of the exciting current in winding 61—63. Wires 95 and 96 from oscillator 90 and wires 97 and 98 from phase splitter 91 carry exciting current to the two stator windings of a two phase resolver 100, these currents being equal in amplitude and differing 90 degrees in time phase.

Figure 5:
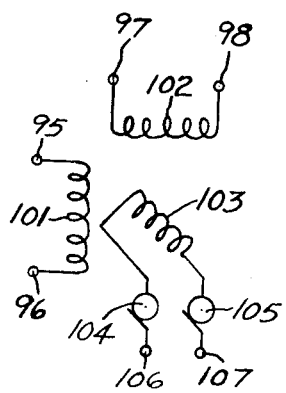
Figure 5 is a diagram of the windings of the resolver.

Referring now to Figure 5 the internal wiring of resolver 100 is shown as comprising a stator coil 101 connected to wires 95 and 96, a stator coil 102 connected to wires 97 and 98 and a rotor winding 103 connected through slip rings 104 and 105 to terminals 106 and 107.

The stator windings 101 and 102 are physically oriented 90° apart in space, and when they are excited with current differing 90° in time phase, the voltage induced in rotor winding 103 is of constant magnitude as the rotor turns through 360° of angle, but the time phase angle of the induced rotor voltage varies linearly with the angular position of the rotor, varying uniformly from 0° to 360° as the rotor turns through one full revolution.

The primary and secondary windings of the electromagnetic transducer of Figure 7 are electrically approximately equivalent respectively to the two stator windings and the rotor winding of resolver 100.

The E. M. F. induced in the secondary coil 75 by the currents circulating in the two primary coils 61—63 and 62—64 may be simply calculated if the difference in radius of the primary and secondary windings is small compared with the radius of either. This permits the assumption that the coils actually consist of a single infinitely long straight secondary conductor lying parallel to an infinite array of uniformly spaced infinitely long coplanar straight primary conductors in which each conductor carries alternating current displaced 90° in time phase with respect to the currents in the two adjacent conductors, with the phase displacement always increasing in a given direction in the plane and normal to the conductors. Thus pairs of conductors one removed from each other carry currents 180° displaced in time phase and hence constitute bifilar circuits.

The voltage induced in the secondary may be computed from the mutual inductance between primary and secondary which is given mathematically by (1) $$M_{12} = \int A_2 \cdot ds_1$$

$A_2$ is the magnetic vector potential due to unit current in a conductor 2, and $ds_1$ is an element of length of conductor 1.

In the case of a secondary conductor lying parallel to a bifilar circuit at a distance $r_1$ from one conductor of the pair, and $r_2$ from the other, in air, (2) $$A = 2I \cdot ln(r_2/r_1)$$

where $A$ is the component of the magnetic vector potential in the direction of the secondary, $I$ is the current in the bifilar circuit, $ln$ symbolizes logarithm to the base $e$.

Combining (1) and (2) gives (3) $$M = 2ln(r_2/r_1)$$

per unit length of secondary for one bifilar primary circuit.

Figure 4:
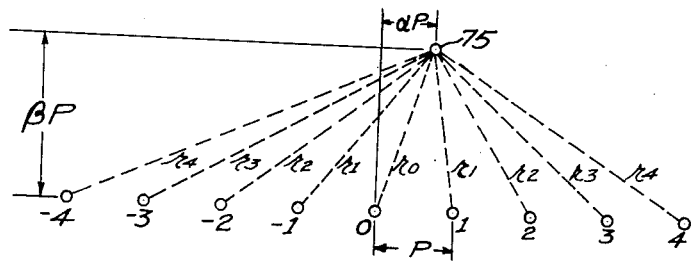
Figure 4 is a diagram of geometric relationships of the windings of the transducer coils.

If referring to Figure 4 the primary conductors are numbered 0, 1, 2, 3, 4, etc. in one direction and 0, −1, −2, −3, −4, etc. in the other, then conductors −4, −2, 0, 2, 4, 6, etc. constitute an infinite array of bifilar circuits in which the currents in conductors −4, 0, +4, etc. may be taken as reference phase. The currents in −2, +2, +6, etc. are then of 180° time phase. If the radii from these conductors to the secondary conductor 75 be denoted by a subscript corresponding to the primary conductor number, the total mutual inductance between the even numbered primary conductors and the secondary is (4) $$M_{even} = 2\left[ ln\frac{r_2}{r_0} + ln\frac{r_6}{r_4} + ln\frac{r_{10}}{r_8} + \cdots + ln\frac{r_{-2}}{r_{-4}} + ln\frac{r_{-6}}{r_{-8}} + \cdots \right]$$

or (5) $$M_{even} = 2\sum_{-\infty}^{+\infty} ln\frac{r_{n+2}}{r_n}$$

$$n = \pm 4m, \; m = 0, 1, 2, 3, \ldots$$

Similarly the mutual inductance between the odd numbered primary conductors and the secondary conductor is given by $$(6) \quad M_{odd} = 2\sum_{-\infty}^{+\infty} ln\frac{r_{n+3}}{r_{n+1}}$$

$$n = \pm 4m, \quad m = 0, 1, 2, 3, \ldots$$

The E. M. F. induced in the secondary 75 by a sinusoidal current $I_{even}$ flowing in the even numbered primary conductors is therefore $$(7) \quad E_{even} = -2\pi f M_{even} I_{even}$$

where $f$ = frequency of the primary current.

Similarly the E. M. F. produced by the odd numbered conductors is $$(8) \quad E_{odd} = -2\pi f M_{odd} I_{odd}$$

The total E. M. F. of the secondary is the vector sum of these terms, $$(9) \quad E_{tot} = -2\pi f (M_{even} I_{even} + M_{odd} I_{odd})$$

Since the two primary currents are adjusted to equal magnitude but 90° phase difference (9) to $$(10) \quad E_{tot} = -2\pi f (M_{even} + j M_{odd}) I_{even}$$

where $$j = \sqrt{-1}$$

The phase angle of this E. M. F. relative to the current in the even numbered primary conductors is $$(11) \quad \phi = \tan^{-1} M_{odd}/M_{even}$$

$$(12) \quad \phi = \tan^{-1}\left[\sum ln\frac{r_{n+3}}{r_{n+1}} \Big/ \sum ln\frac{r_{n+2}}{r_n}\right]$$

Expression 12 has been evaluated by machine methods to determine the phase angle $\phi$ as a function of the position of the secondary with respect to the primary conductors, both in separation, $\beta P$, from the plane of the primary and in tangential displacement $\alpha P$ where $P=$ the pitch of the primary winding. The calculation shows that the phase angle varies very nearly linearly with tangential displacement, even when the separation of the secondary from the plane of the primary is less than the pitch of the primary winding. For example, at a separation of 2 times the pitch of the primary, the maximum deviation from linear phase-shift is less than .015 degree, or about one part in 25,000 of one complete cycle. Thus if the winding pitch were .010", the lead would be .040", and for a separation of .020" between the windings the theoretical accuracy of measurement of axial movement is approximately $1.6 \times 10^{-6}$ inches.

The above discussion shows that the signal output of the transducer is a sinusoidal voltage whose phase shift varies linearly with relative linear axial displacement of the primary and secondary windings when the two primary bifilar circuits are excited in quadrature. In order to convert this signal into a suitable form for instrumentation, I make use of the properties of a class of apparatus which may be designated "phase shifters," in which an output voltage varying from 0 to 360° in relative phase may be obtained from a shaft rotation. An example of such an apparatus is the two-phase rotary inductor or resolver.

Referring to Figure 7, the rotor winding of resolver 100 is connected through terminals 106 and 107 by wires 110 and 111 to a phase sensitive detector 112, which is sometimes called a demodulator, the output voltage of the resolver serving as the carrier or reference input to the phase sensitive detector. The output voltage of secondary winding 75 is amplified in amplifier 113, the output of which through line 114 constitutes the signal input to the phase sensitive detector 112. The phase sensitive detector develops a D. C. voltage proportional to the component of input voltage from amplifier 113 in phase with the resolver output phase reference voltage.

The detector output suitably amplified energizes D. C. servo motor 115 to which it is connected by line 116, and motor 115 in turn drives resolver 100 through gearing 120. The polarity of the connection between servo motor 115 and the output of the servo amplifier portion of the phase sensitive detector and servo amplifier 112 is chosen in such a sense that the servo motor driving resolver 100 causes a rotation of the rotor of resolver 100 and consequently a change in the phase angle of the output voltage of resolver 100 such that the resolver is driven toward the point where the phase of its output voltage is identical to that of the phase of the signal voltage supplied to phase detector 112 from amplifier 113. Thus when relative motion between the primary windings on shaft 50 and the secondary winding 75 occurs, thereby shifting the phase of the secondary voltage, the rotor of resolver 100 driven by servo motor 115 moves in synchronism, a zero phase difference condition being maintained between the voltages on lines 110 and 114. In other words the angular position of the rotor shaft of resolver 100 is linearly proportional to the relative position of the primary and secondary windings of the electromagnetic transducer, said rotor making one complete revolution for a relative movement of said two windings equal to the lead of the windings. The resolver shaft may make as many complete turns as the quotient of relative movement divided by lead value, limited only by the physical range of travel of the primary and secondary components of the electromagnetic transducer. Thus the resolver controls the servo motor to bring the dials, hereinafter described, to the reading warranted by the mechanical translation of the table 12 within the limits of accuracy indicated herein. This may occur with or without hunting depending on the particular embodiment.

Inasmuch as oscillators, amplifiers, phase splitters, phase sensitive detectors, servo motors, power supplies, etc. are well understood in the art, I need not describe same in detail. Where lines have been mentioned electric connections are intended and this involves two or more wires in each case but how to connect amplifiers to phase detectors, phase splitters to resolvers, power supplies to oscillators, oscillators to resolvers, and so forth is fully understood in the art and hence I need not describe same in detail either.

Figure 3:
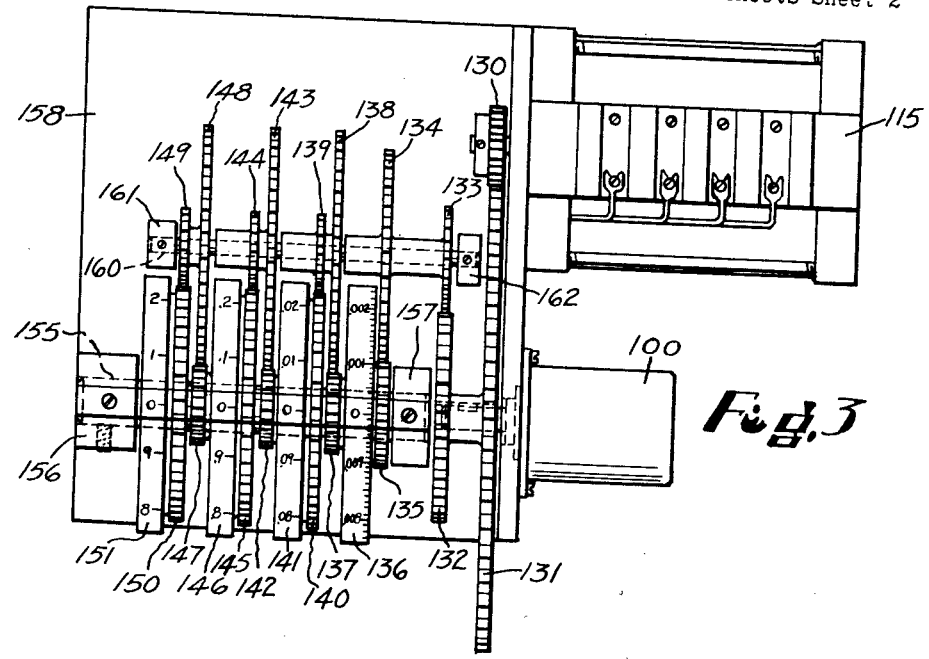
Figure 3 is an elevation, with some of the covers removed in order to illustrate the mechanism, of a servomotor driving a decimal digit counter and a resolver.

Referring now to Figure 3, the servo motor 115 drives a pinion gear 130 which meshes with a large gear 131 which is connected to a gear 132 which drives a gear 133 which is connected to a gear 134 which drives a gear 135. The gear 135 is connected to a dial 136 which is graduated in thousandths and one revolution of which represents ten one-thousandths to wit one hundredth of an inch of travel.

The graduated dial 136 is connected to a gear 137 which drives a gear 138 connected to a pinion gear 139 which drives a large gear 140 connected to a graduated dial 141. The gear ratio from 137 to 140 is such that the graduated dial 141 revolves at one-tenth of the speed of the graduated dial 136. The graduations on the dial 141 are in increments of ten one-thousandths of an inch (hundredths of an inch) and one complete revolution represents one-tenth of an inch.

The gear 140 is connected to a gear 142 which drives a gear 143 which is connected to a pinion gear 144 which drives a large gear 145. This large gear 145 is connected to a graduated dial 146 the graduations of which represent one-tenth of an inch and one complete turn of which represents one inch.

The gear 145 is connected to a gear 147 which drives a gear 148 which is connected to a pinion gear 149 which drives a large gear 150 connected to a graduated dial 151. The graduations of the dial 151 are in increments of one inch and one complete revolution of the dial 151 represents a movement of one inch. The foregoing description of the ratios is illustrative and any other system can be used within the scope of the invention.

For journalling the gears 135, 137, 140, 142, 145, 147 and 150, I may provide a shaft 155 supported by a hangar 156 and another hangar 157 extending upwardly from a base plate 158. For supporting the gears 133, 134, 138, 139, 143, 144, 148 and 149, I may provide a stationary shaft 160 supported by hangars 161 and 162 extending upwardly from the base 158. The gears 131 and 132 are fastened or splined to the shaft 165 of the resolver 100. Thus whenever the servo motor moves the resolver 100 will also move and conveniently the ratio is a step down ratio so that the resolver moves more slowly.

As an illustrative example of the use of this electromagnetic micrometer let us suppose that it is desired to measure the cumulative lead error of a precision tap. The precision tap is mounted by suitable supporting members not shown on carriage 12 being clamped securely thereto through the agency of T-slots 15, its axis being set parallel to the axis of slideways 11 and horizontally aligned so that its axis coincides with the vertical axis of microscope 35. By adjustment of coarse and fine focusing controls 30 and 31 the microscope 35 is brought to focus on an appropriate reference mark on the thread form of the tap for example on the crest of the thread. A notation is made of the reading of the counter dials of Figure 3. Then handwheel 40 is rotated turning lead screw 41, moving carriage 13 until there appears under microscope 35 the corresponding crest of the thread of the tap adjacent to the first crest upon which the first setting was made. A second reading is taken of the counter dial of Figure 3. The difference between the first and second readings represents the pitch of the tap. Successive settings are made in the same manner on each subsequent thread crest of the tap, and corresponding readings of the counter are noted, thus establishing a table of values of actual lead of the tap accurate to a precision determined almost entirely by the accuracy of construction of the electromagnetic transducer of Figure 7.

The oscillator 90 and phase splitter 91 constitute means for producing two phase alternatnig current voltage. Thus the bifilar windings 61—63 and 62—64 are excited by two phase A. C. voltage and so also are the stator windings 101 and 102 of the resolver 100.

The bifilar windings of the primary are helical, of equal lead and arranged in overlapping relation. The turns of the secondary 75 as well as the alternate embodiment 77, 78 are helical and spaced by a uniform distance from the primary bifilar windings. The turns of the secondary have the same lead as the turns of the primary bifilar windings. Where a bifilar winding is used for the secondary it should be of lead equal to the lead of the bifilar windings of the primary.

The entire system measures the relative position of a pair of rectilinearly movable machine elements. The primary is secured to one of this pair of elements while the secondary is secured to the other thereof. The invention provides electrical means connected to the transformer secondary giving an output responsive to the relative position of the primary with regard to the secondary and there is further means responsive to this output to indicate the relative position of the machine elements. The electrical means connected to the transformer secondary is the amplifier 113 and the phase sensitive detector and servo amplifier 112. The servomotor itself is responsive to this output to indicate the relative position of the machine elements. However many other indicators could be used such as an indicating meter.

In the present embodiment of the invention which gives accurate results with easy reading the means responsive to the output to indicate the relative position of the machine elements is a servomotor and a resolver, the resolver controlling the servomotor by feeding back a signal to the phase sensitive detector which itself feeds into the servomotor through the servo amplifier. Thus in effect the resolver tells the servomotor when to stop and the latter if necessary hunts for position to give an accurate reading.

It will be noticed that the servomotor is mechanically geared to the resolver and this gearing is illustrated as a step-down gearing but within the scope of the invention could be a one to one gearing or a step-up gearing. In shunt connection with this gearing is the reversible counter constituted by the dials 151, 146, 141 and 136. These will count in either direction as the servomotor operates responsive to movement of the table 12 on the base 10 and so I call it a reversible counter. It counts the position of one of the rectilinearly movable machine elements upon the other. This counter which indicates the relative position of the machine elements could feed its information to power instrumentalities to perform some operation. For instance it could be added to other information to change the position of the table itself. However even in such modified form it should still be means responsive to the output of the secondary to indicate the relative position of the machine elements.

It will thus be seen that there has been provided by this invention an electric micrometer in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. In apparatus of the class described, means for producing two phase alternating current voltage, a transformer primary connected to said means for producing two phase voltage, said primary comprising a pair of bifilar windings, said bifilar windings being helical of equal lead and arranged in overlapping relation, a transformer secondary the turns of which are helical and spaced by a uniform distance from said primary bifilar windings and said turns having the same lead as the turns of the said primary bifilar windings, a pair of rectilinearly movable machine elements, said primary being secured to one of said pair of elements and said secondary being secured to the other of said pair of elements, electrical means connected to the transformer secondary giving an output responsive to the relative position of said primary with respect to said secondary, and means responsive to said output to indicate said relative position of the machine elements.

2. Apparatus according to claim 1 in which said secondary comprises a bifilar winding of lead equal to the lead of the bifilar windings of the primary.

3. Apparatus according to claim 2 in which said electrical means connected to said secondary comprises a phase sensitive detector, a resolver connected to said detector, and also connected to said source of two phase alternating current voltage, and means for indicating the output of said detector.

4. Apparatus according to claim 3 in which said indicating means comprises a servomotor, gearing connecting said servomotor to said resolver, a reversible counter, and a mechanical connection between said gearing and said reversible counter to drive the latter from the former.

5. Apparatus according to claim 1 in which said electrical means connected to said secondary comprises a phase sensitive detector, a resolver connected to said detector and also connected to said source of two phase alternating current voltage, and means for indicating the output of said detector.

6. Apparatus according to claim 5 in which said indicating means comprises a servomotor, gearing connecting said servomotor to said resolver, a reversible counter, and a mechanical connection between said gearing and said reversible counter to drive the latter from the former.

No references cited.